United States Patent [19]
Adachi

[11] Patent Number: 5,514,993
[45] Date of Patent: May 7, 1996

[54] APPARATUS FOR PREVENTING TRANSFERRING NOISE OF DIGITAL SIGNAL

[75] Inventor: Kiyoshi Adachi, Itami, Japan

[73] Assignee: Mitsubishi Denki Kabushiki Kaisha, Tokyo, Japan

[21] Appl. No.: 181,076

[22] Filed: Jan. 14, 1994

[30] Foreign Application Priority Data

Feb. 3, 1993 [JP] Japan ................. 5-016084

[51] Int. Cl.⁶ ............... H03K 17/16; H03K 5/01
[52] U.S. Cl. ............. 327/379; 327/384; 327/391; 327/165; 327/166; 326/21; 326/27
[58] Field of Search ................. 307/542, 571, 307/572, 573, 576, 579, 585, 272.1, 272.2, 443, 451; 327/310, 379, 384, 387, 391, 199, 200, 201, 202, 210, 215, 225, 165, 166, 551; 326/21, 29, 30, 27

[56] References Cited

U.S. PATENT DOCUMENTS

| | | | |
|---|---|---|---|
| 3,493,785 | 2/1970 | Rapp | 327/210 |
| 3,624,518 | 11/1971 | Dildy, Jr. | 327/384 |
| 4,461,964 | 7/1984 | Shiotari | 327/215 |
| 4,583,007 | 4/1986 | Paski | 327/165 |
| 4,695,743 | 9/1987 | Des Brisay, Jr. | 327/215 |

FOREIGN PATENT DOCUMENTS

| | | |
|---|---|---|
| 4121444A1 | 1/1992 | Germany . |
| 3-24601 | 2/1991 | Japan . |

*Primary Examiner*—David C. Nelms
*Assistant Examiner*—Trong Phan
*Attorney, Agent, or Firm*—Lowe, Price, LeBlanc & Becker

[57] ABSTRACT

An apparatus for preventing transferring noise of a digital signal comprises, a noise-transfer preventing circuit 11 which transfers a signal D whose potential represents data to be transferred originally in binary data and a signal DB whose potential represents the other data at the same time, inputs the signals D and DB at an input block 10 side, outputs one signal D as an input signal as a normal state when the signals D and DB are the potentials representing different data "1" and "0", and when the signals D and DB are the potentials representing same data, continues to output the signal previously outputted as the input signal as an abnormal state, whereby, at the time of transferring the digital signal, it can be avoided to transfer the level change according to fluctuations of the signal potential or the signal change on the other signal lines as the dat signal.

4 Claims, 8 Drawing Sheets

APPARATUS FOR PREVENTING TRANSFERRING NOISE OF DIGITAL SIGNAL

BACKGROUND OF THE INVENTION

1. Field of the Invention

The present invention relates to an apparatus for preventing transferring noises of a digital signal which is generated and transferred in a digital signal processor such as a microcomputer.

2. Description of the Related Art

During the operation of a digital signal processor such as a microcomputer, switchings (ON/OFF) are continuously repeated in internal transistors. By the switchings of the transistors, potential fluctuations or noises are generated in a power source or a signal line. And hence, when the potential fluctuations or noises are generated at the time of receiving and giving the signals via buses by respective functional blocks in the microcomputer, it brings about a false signal recognition and there is the possibility of malfunction of the microcomputer.

FIG. 1 shows a schematic equivalent circuit diagram of a C-MOS inverter circuit as one example of a circuit which receives and gives a digital signal.

In FIG. 1, reference characters R1 and R2 designate parasitic resistances, L1 and L2 designate parasitic impedances, C designates a parasitic capacity against a power source, Tr1 designates a Pch (P channel) transistor, Tr2 designates an Nch (N channel) transistor, 1 designates a power line connected to a power potential Vcc and 2 designates a ground line connected to a ground potential Vss.

In such C-MOS inverter circuit, when its input signal changes to the ground potential Vss from the power potential Vcc, the Pch transistor Tr1 transits to an ON state from an OFF state, and the Nch transistor Tr2 transits to the OFF state from the ON state. Conversely, when the input signal changes to the power potential Vcc from the ground potential Vss, the Pch transistor Tr1 transits to the OFF state from the ON state, and the Nch transistor Tr2 transits to the ON state from the OFF state.

These operations are called a switching operation of the inverter.

When the input signal of the inverter is switched to the ground potential Vss from the power potential Vcc and an output signal of the same is switched to the power potential Vcc from the ground potential Vss, a through current $I_K$ and a discharge current $I_J$ against load capacity flow. At this time, the power potential Vcc drops temporarily due to the resistance and inductance component which are parasitic on the circuit.

In FIG. 1, directions of arrows respectively indicate the flowing directions of electric currents $I_K$ and $I_J$.

Conversely, when the input signal of the inverter is switched to the power potential Vcc from the ground potential Vss, and the output signal of the same is switched to the ground potential Vss from the power potential Vcc, the through current $I_K$ and a discharge current $I_H$ against the load capacity flow. At this time, the ground potential Vss rises conversely due to the same reason mentioned above.

A rate of such drop of the power potential Vcc and rise of the ground potential Vss varies with the number of switching transistors or the positional relationship between the switching transistor and the power line.

A wave-form diagram of FIG. 2 shows the signal potential fluctuation on the power line according to the inverter switchings. In FIG. 2, reference character h1 designates an output signal wave form of the inverter, h2 designates a wave form of the power potential Vcc and h3 designates a wave form of the ground potential Vss.

When the wave form h1 of the inverter output signal changes to the power potential Vcc from the ground potential Vss, the wave form h2 of the power potential Vcc drops relatively largely, and the wave form h3 of the ground potential Vss rises slightly. When the wave form h1 of the inverter output signal changes to the ground potential Vss from the power potential Vcc, the wave form h2 of the power potential Vcc drops slightly and the wave form h3 of the ground potential Vss rises relatively largely.

Meanwhile, FIG. 3(a) shows a schematic view of signal lines wired closely on the bus, and FIG. 3(b) shows their equivalent circuit diagram.

In the figures, reference characters LD and LD' designates the signal lines wired closely, C1 and C2 designate parasitic capacities against the ground potential Vss, and C3 designates the parasitic capacity between the signal lines LD and LD'.

When the signal lines are wired closely on the bus as such, it is well known that the signal change in one signal line may be transferred to the signal of the other signal line by a capacity coupling due to the parasitic capacity C3 between the signal lines.

A wave-form diagram of FIG. 4 shows a state of change of a signal wave form h5 on the other signal line LD according to the change of a signal wave form h4 on one signal line LD'.

FIG. 5 is a circuit diagram showing an example of configuration, wherein two aforementioned inverter circuits (INV1, INV3) shown in FIG. 1 are used to constitute a signal output block 6 and a signal input block 10, and further, the two blocks are connected via a bus 7.

In FIG. 5, like reference characters in aforementioned FIG. 1 designate like or corresponding parts. A reference character INV4 designates an inverter circuit having the same configuration as the inverter circuit shown in FIG. 1 as same as INV1 and INV3, and disposed in the output block 6 or in the vicinity thereof. A current driving power of the inverter circuit INV4 is sufficiently large as compared with the other inverter circuits INV1, INV3, and is capable of driving the load capacity of about parasitic capacity of the bus 7.

In the following description, as to the signal on the signal line, the case where its potential is on the power potential Vcc side is referred to as data "1" or merely "1", and the case on the ground potential Vss side is referred to as data "0" or merely "0".

Hereupon, when the inverter circuit INV1 outputs "1" to the signal line LD on the bus 7 in the output block 6, and the output signal of the inverter circuit INV4 inverts to "1" from "0" when the inverter circuit INV3 receives the signal from the signal line LD in the input block 10, as shown in FIG. 2, the power potential Vcc of the output block 6 drops. A drop of the power potential Vcc is transferred to the signal line LD via the Pch transistor Tr1 of the inverter circuit INV1, and reaches an input terminal of the inverter circuit INV3 of the input block 10. Furthermore, when the drop amount of potential reaches a threshold level (usually one half of the power potential Vcc) of the inverter circuit INV3, it is transferred into the input block 10 as data "0" to cause malfunction of the input block 10.

When the inverter circuit INV1 outputs "0" to the signal line LD of the bus 7 in the case where the output signal of the inverter circuit INV4 inverts to "1" from "0", the above-mentioned same malfunction is produced.

When the signal line LD is disposed closely to the other signal line LD' also on the bus 7, since the capacity coupling is generated by the parasitic capacity between the lines, the signal change on the signal line LD' changes a potential of the signal line LD temporarily. Even in this case, when a noise level generated in the signal line LD reaches the threshold value of the inverter circuit INV3 in the input block 10, the input block 10 operates falsely.

As mentioned above, in the digital signal processor such as the microcomputer and the like, there was the possibility that the potential changes temporarily due to the potential fluctuations in the signal line which is to maintain the power potential Vcc or the ground potential Vss during the operation, or the signal change of the other signal line disposed in the bus, and thereby producing the malfunction when the input side circuit inputs the potential change as data signals.

In recent years, in the digital signal processor such as the microcomputer and the like, the low voltage power potential is becoming popular. And hence, in such processor, an absolute potential difference between the power potential Vcc and the ground potential Vss is small, and easily influenced by the aforementioned potential fluctuations and the change of the other signal.

Due to such circumstances, the invention of, for example, Japanese Patent Application Laid-Open No. 3-24601 (1991) has been proposed. However, in this invention, when data which is to be transferred originally is "1 or (0)", data "0 (or 1")" is transferred at the same time, and two data are stored once in a memory for comparison in the input side circuit into which the signals are inputted. In such configuration, a real time processing is impossible, and even when comparing directly without storing in the memory, since it is necessary to request to the signal output side to output the signal again when the false signal is inputted, the real time processing is also impossible.

SUMMARY OF THE INVENTION

The present invention has been devised in view of such circumstances, therefore, it is an object thereof to provide an apparatus for preventing transferring noise of a digital signal capable of preventing transfer of the level change according to signal potential fluctuations or the signal change on the other signal line as a data signal, at the time of transferring the digital signal.

The apparatus for preventing transferring noise of a digital signal of the present invention comprises noise-transfer preventing means which transfers a potential signal representing data which is to be transferred originally in binary data, and a potential signal representing the other data at the same time, inputs two signals at a signal input side, when the signals are the potentials respectively representing different data, outputs one signal as the input signal as a normal state, and when the signals are the potentials representing same data, continues to output the signal previously outputted as it is as the input signal as an abnormal state.

The apparatus for preventing transferring noise of a digital signal of the present invention has a wiring in which signal lines transferring the two signals respectively are wired such that, one signal line is apart from a third signal line close to the other line or its inverted signal line.

In the apparatus for preventing transferring noise of a digital signal of the present invention, when the potential signals representing the different data are inputted at the signal input side, one signal is outputted as the input signal as the normal state, and when the potential signals representing the same data are inputted, the signal which has been outputted before is outputted as it is as the input signal as the abnormal state.

Also, in the apparatus for preventing transferring noise of a digital signal of the present invention, since one signal line is not wired closely to the other signal line or the inverted signal line of another signal line which is close to one signal line, is not wired closely to the other signal line, the possibility of generation of noise due to the potential change between the lines is low.

The above and further objects and features of the invention will more fully be apparent from the following detailed description with accompanying drawings.

DESCRIPTION OF THE PREFERRED EMBODIMENTS

In the following, the present invention is particularly described based on the drawings showing its embodiments.

Figure 1:
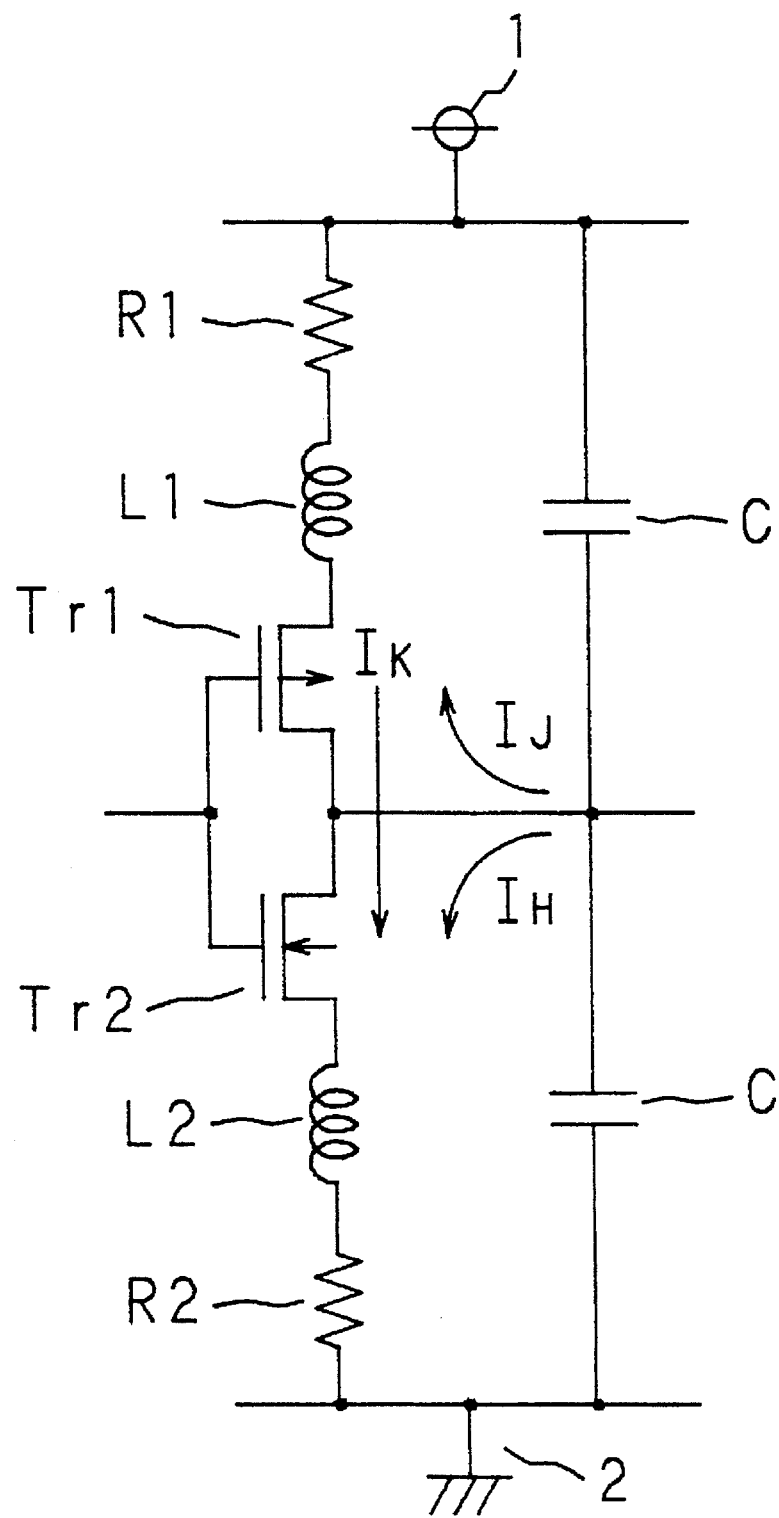
FIG. 1 is a schematic equivalent circuit diagram of a C-MOS inverter as a general example of a conventional circuit which receives and gives a digital signal.
Figure 2:
FIG. 2 is a wave-form diagram showing a state of signal potential fluctuations on a power line according to switchings of an inverter circuit, in a conventional circuit which receives and gives a digital signal.
Figure 3A:
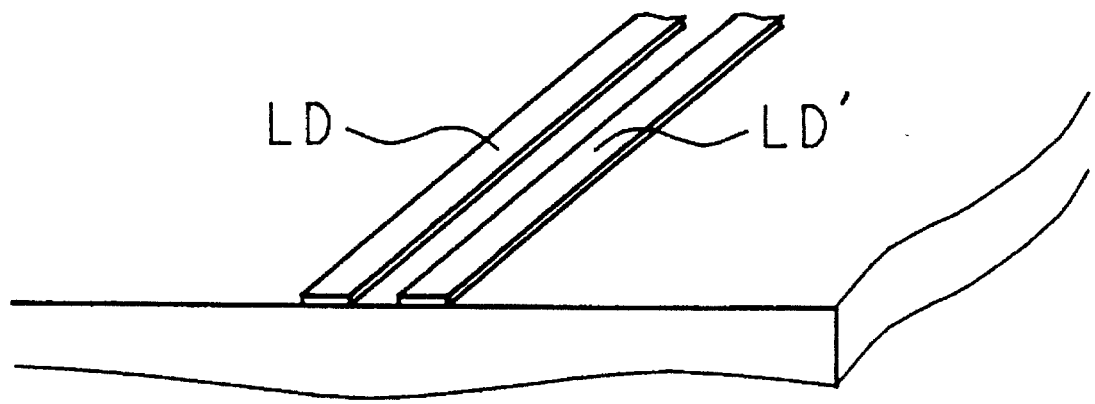
FIG. 3(a) is a schematic view showing a state of signal lines wired closely in a conventional circuit which receives and gives a digital signal.
Figure 3B:
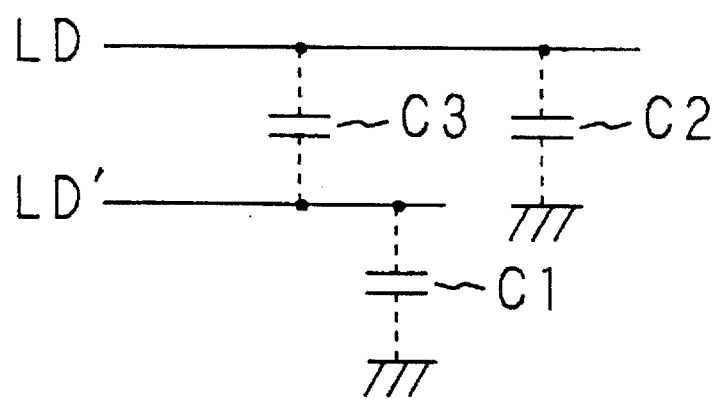
FIG. 3(b) is an equivalent circuit diagram of signal lines wired closely in a conventional circuit which receives and gives a digital signal.
Figure 4:
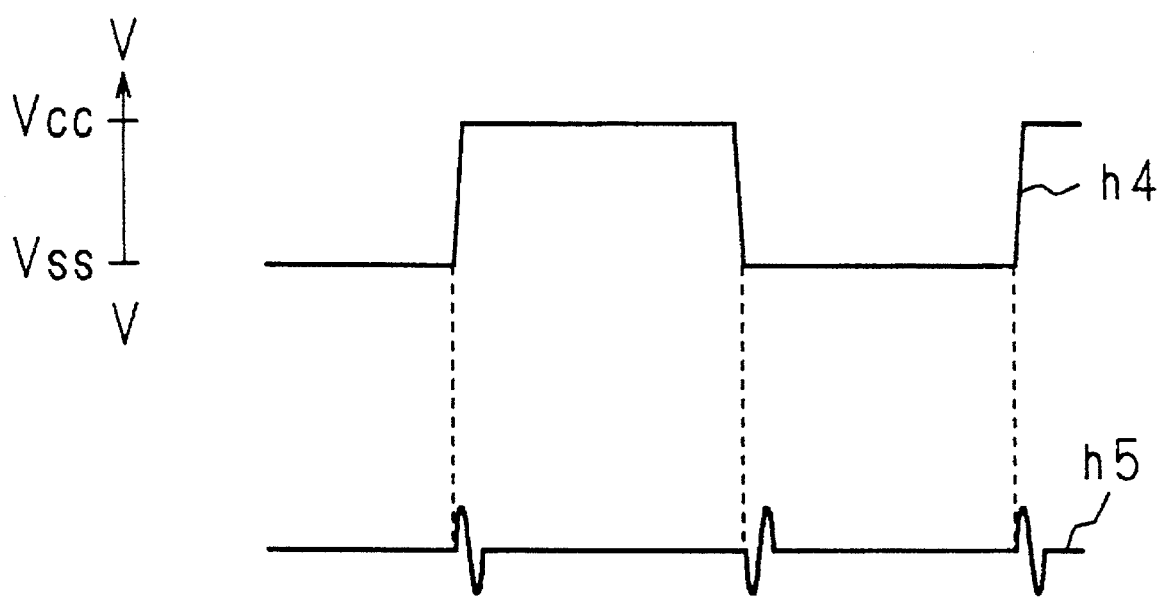
FIG. 4 is a wave-form diagram showing a sate of the signal wave form change on the other signal line according to the signal wave form change on one signal line in FIG. 3.
Figure 5:
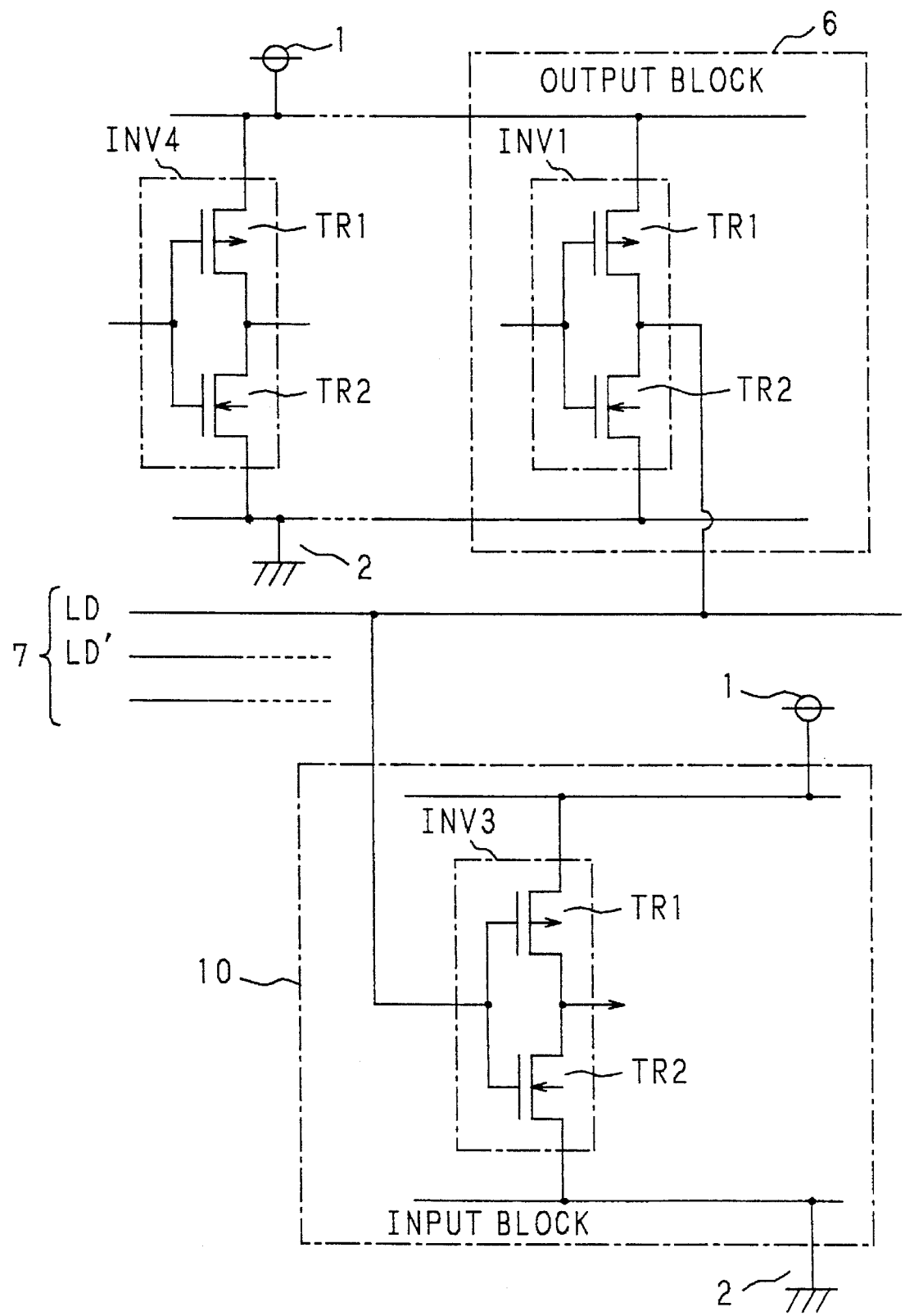
FIG. 5 is a circuit diagram showing an example of configuration of a conventional general apparatus transferring a digital signal, wherein two inverter circuits shown in FIG. 1 are used to constitute a signal output circuit and a signal input circuit, and further, two circuits are connected via a bus.
Figure 6:
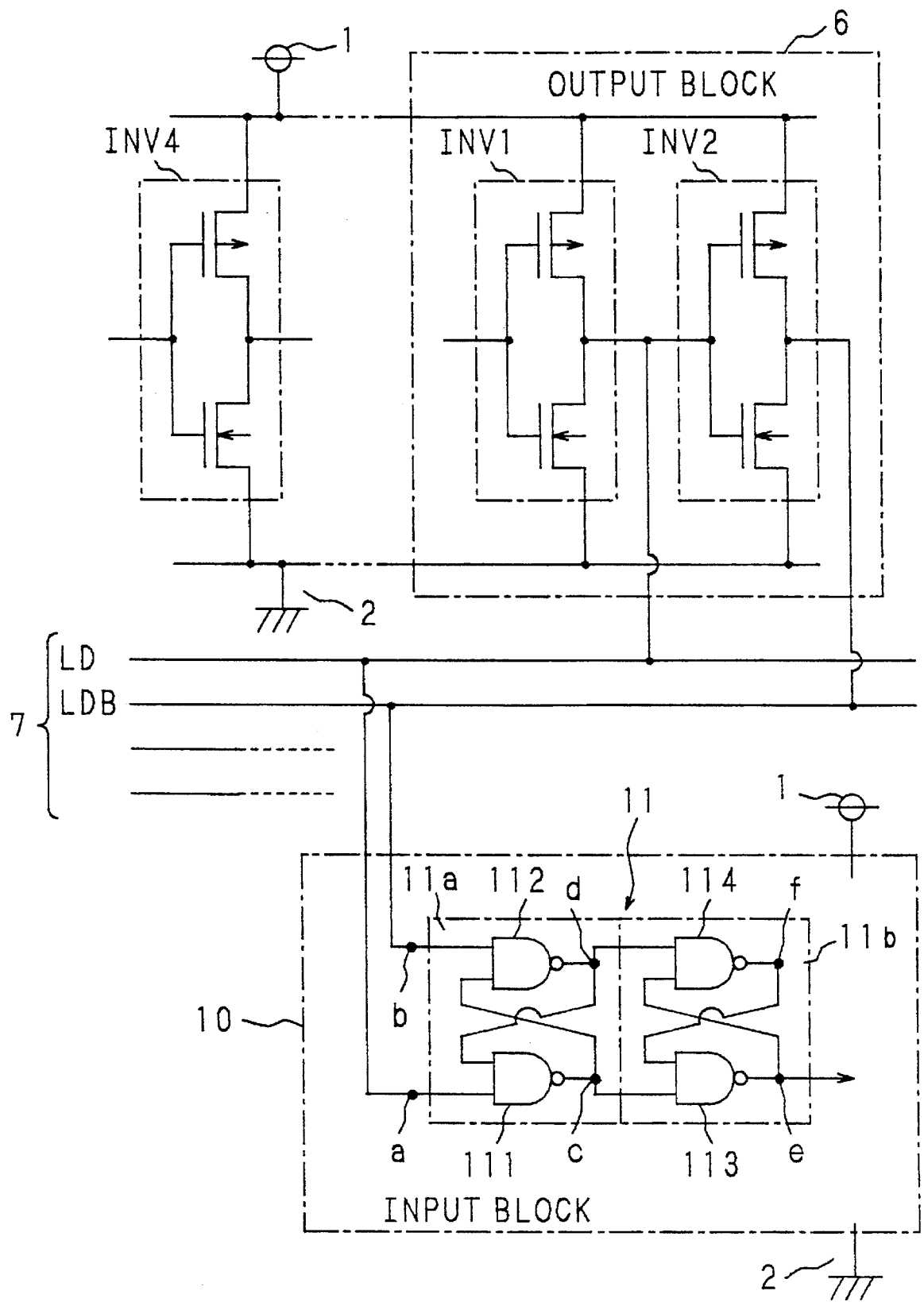
FIG. 6 is a circuit diagram showing one embodiment of an apparatus for preventing transferring noise of a digital signal according to the present, invention.

FIG. 6 is a circuit diagram showing one embodiment of an apparatus for preventing transferring noise of a digital signal according to the present invention, wherein, as same as an aforementioned conventional configuration shown in FIG. 5, an output block 6 and an input block 10 are connected via a bus 7. An inverter circuit INV4 is also included therein.

In FIG. 6, numeral 1 designates a power line connected to a power source of a potential Vcc, and numeral 2 designates a ground line connected to a ground of a potential Vss.

Hereupon, the output block 6 including an inverter circuit INV1 and an inverter circuit INV2 is shown as an example of circuit on a data output, side, and the input block 10 including a noise-transfer preventing circuit 11 is shown as an example of circuit on a data input side, the blocks 6 and 10 are connected by the bus 7.

Though the output block 6 includes only the inverter circuit INV1 in the conventional example shown in FIG. 5, in the embodiment of the present invention, it includes the inverter circuit INV2 for inverting an output signal of the inverter circuit INV1. Though the output signal D from the inverter circuit INV1 is outputted to a signal line LD of the bus 7 as same as the conventional example, an output signal DB from the inverter circuit INV2 is outputted to a signal line LDB of the bus 7. Thus, the signal D on the signal line LD and the signal DB on the signal line LDB are the inverted signals.

Figure 7:
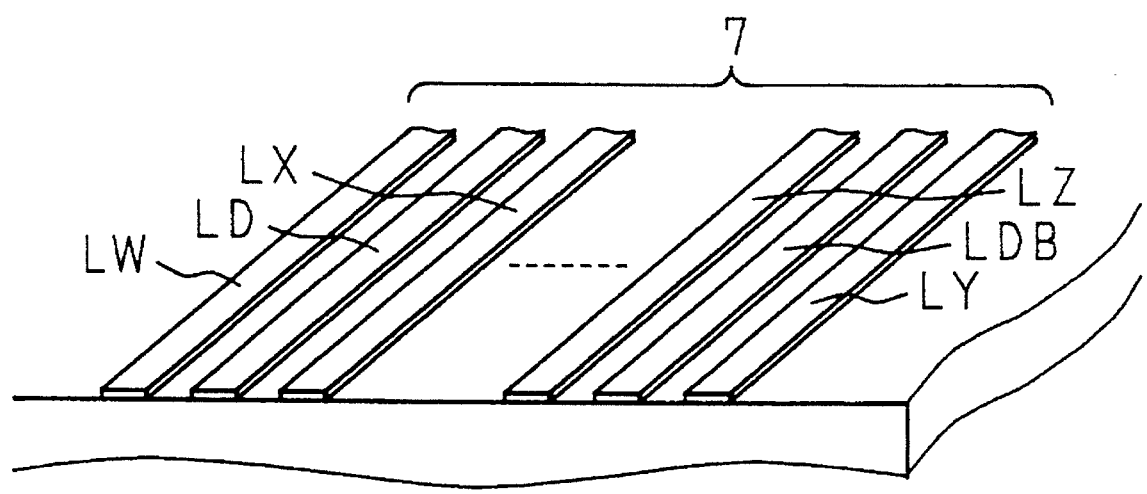
FIG. 7 is a schematic view showing a wired state of signal lines and inverted signal lines on a chip, which connect a signal input circuit and a signal output circuit of an apparatus for preventing transferring noise of a digital signal according to the present invention.

The above-mentioned signal lines LD and LDB are wired as shown in FIG. 7 on a chip such as a microcomputer and the like. That is, in FIG. 7, numeral 7 designates buses in a lump and individual signal lines LW, LD, LX, . . . , LZ, LDB and LY constituted by a conductive material are disposed on the chip in order.

The signal line LW transfers a signal W, the signal line LD transfer a signal D, the signal line LX transfers a signal X, . . . , the signal line LZ transfers a signal Z, the signal line LDB transfers a signal DB and the signal line LY transfers a signal Y.

Hereupon, it is so designed that the signal lines LW and LX which are close to the signal line LD transferring the signal D are not wired closely to the signal line LDB transferring the signal DB. In other words, at least two signal lines are disposed between the signal lines LD and LDB.

Meanwhile, it is so designed that either of the signal lines LW and LX close to the signal line LD is not an inverted signal line of neither the signal lines LY nor LZ close to the signal line LDB. In other words, the inverted signal line of the signal line close to one signal line LD is designed to apart from the other signal line LDB.

The noise-transfer preventing circuit 11 of the input block 10 is constituted by connecting two flip-flops 11a 11b respectively constituted by two NAND gates 111, 112 and 113, 114 in series, wherein input terminals a and b of the flip-flop 11a on the input side (first-stage) constituted by the NAND gates 111 and 112 are connected to the signal lines LD and LDB of the bus 7 respectively.

One input terminal of the NAND gate 111 is an input terminal a of the first-stage flip-flop 11a connected to the signal line LD as mentioned above, and the other input terminal is connected to an output terminal d of the NAND gate 112. Also, one input terminal of the NAND gate 112 is an input terminal b of the first-stage flip-flop 11a connected to the signal line LDB as mentioned above, and the other input terminal is connected to an output terminal c of the NAND gate 111.

One input terminal of the NAND gate 113 is connected to the above-mentioned output terminal c of the NAND gate 111, and the other input terminal of the same is connected to an output terminal f of the NAND gate 114. Also, one input terminal of the NAND gate 114 is connected to the above-mentioned output terminal d of the NAND gate 112, and the other input terminal is connected to an output terminal e of the NAND gate 113.

An output from the output terminal e of the NAND gate 113 becomes an output signal of the after-stage flip-flop 11b, in other words, an output signal of the noise-transfer preventing circuit 11.

The operation of the circuit shown in FIG. 6 is as follows.

When data "1" is outputted to the signal line LD on the bus 7 from the inverter circuit INV1 of the output block 6, data "0", which is its inverted signal, is outputted to the signal line LDB from the inverter circuit INV2 at the same time. These data are respectively inputted to the input terminals a and b of the first-stage flip-flop 11a of the noise-transfer preventing circuit 11. Thereby, the output terminals c and d of the first-stage flip-flop 11a of the noise-transfer preventing circuit 11 become "0" and "1" respectively. Thus, the output, terminals e and f of the after-stage flip-flop 1 b become "1" and "0" respectively, and "1" outputted from the output terminals e becomes an original input signal to the input block 10.

Conversely, when the data "0" is outputted to the signal line LD on the bus 7 from the inverter circuit INV1 of the output block 6, the data "1" which is its inverted signal is outputted to the signal line LDB from the inverter circuit INV2 at the same time. In this case, the output terminals c and d of the first-stage flip-flop 11a become "1" and "0" respectively, the output terminals e and f of the after-stage flip-flop 1ib become "0" and "1" respectively, and "0" outputted from the output terminal e becomes the original input signal to the input block 10.

Hereupon, in the normal state, "1" is outputted to the signal line LD and "0" is outputted to the signal line LDB at the same time from the output block 6, when the power potential Vcc in the output block 6 drops temporarily due to switchings of the transistors, or the potential of the signal line LD drops below the threshold value of the NAND gate of the noise-transfer preventing circuit 11 due to the signal change on the signal line close to the signal line LD, the signal inputted to the input terminal a of the first-stage flip-flop 11a is judged as data "0". Responding thereto, the output signal from the output terminal c of the first-stage flip-flop 11a also becomes "1". However, since the input signal to the input terminal b of the first-stage flip-flop 11a stays as it is without change, the output signal from the output terminal d is also kept at "1"as it is. At this time, the output signal from the output terminal f of the after-stage flip-flop 11b is originally "0", thus the output signal from the output terminal e is kept at "1".

In other words, even when only the input signal to the input terminal a of the noise-transfer preventing circuit 11, which is originally be "1", changes to "0" from "1", as long as the input signal to the input terminal b is kept at original "0", the output terminals e and f of the after-stage flip-flop 11b are not influenced by the change of the input signal to the input terminal from "1" to "0".

Meanwhile, when the potential of the signal line LD stays at "1" and that of the signal line LDB rises, the signal inputted to the input terminal b of the first-stage flip-flop 11a of the noise-transfer preventing circuit 11 is judged as data "1". However, in this case, since the input signal to the input terminal a of the first-stage flip-flop 11a stays at "1", the output signal from the output terminal c also stays at "0", and the output signal from the output terminal d stays at "1" without change. Thus, the output signals from the output terminals e and f of the after-stage flip-flop 11b also keep the state of "1" and "0"respectively.

In other words, even when only the output signal from the input terminal b of the first-stage flip-flop 11a, which is originally be "0", changes to "1" from "0", the change does not influence the output signals from the output terminals e and f of the after-stage flip-flop 11b.

Also, when "0" is outputted to the signal line LD and "1" is outputted to the signal line LDB from the output block 6, similarly, even when either of the input signals to the input terminals a and b of the first-stage flip-flop 11a of the noise-transfer preventing circuit 11 has changed, the change is never transferred to the output signals from the output terminals e and f of the after-stage flip-flop 11b.

Figure 8:
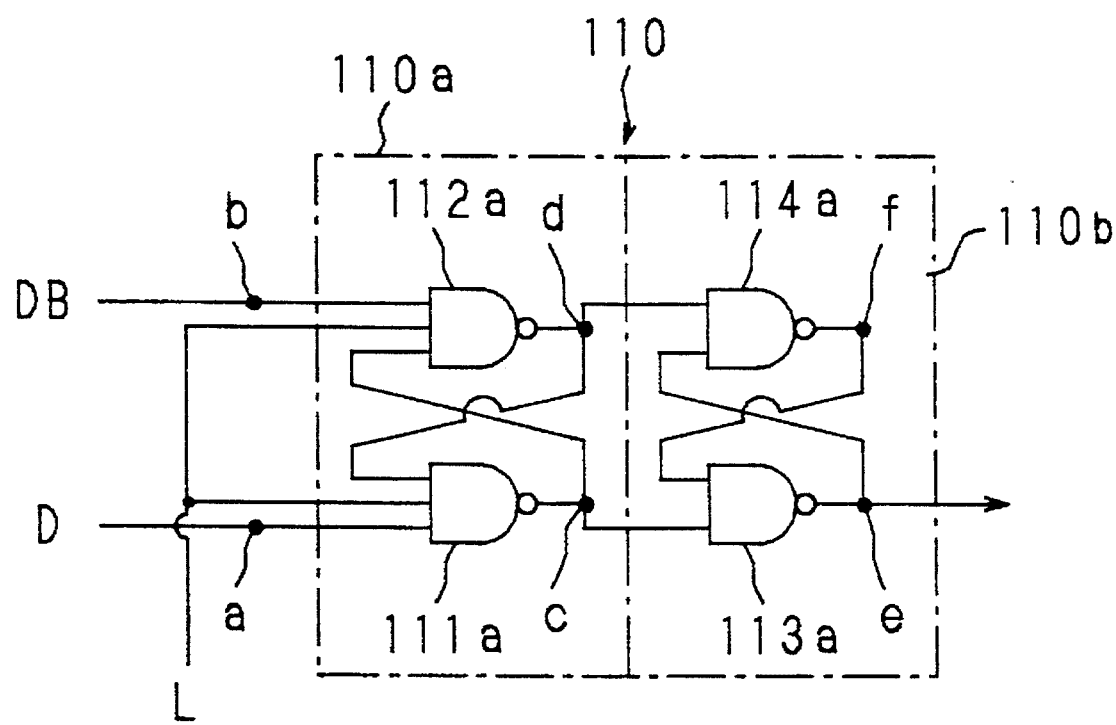
FIG. 8 is a circuit diagram of a noise-transfer preventing circuit of showing another embodiment of an apparatus for preventing transferring noise of a digital signal according to the present invention.

FIG. 8 is a circuit diagram showing an example of configuration of a noise-transfer preventing circuit 110 in the case of adding a function as a latch circuit to the noise-transfer preventing circuit 11 shown in FIG. 6.

In the configuration shown in FIG. 8, it is so constructed that, NAND gates 111a and 112a constituting a first-stage flip-flop 110a of the noise-transfer preventing circuit 11 serve as 3 inputs, and a latch signal L can be inputted additionally.

In the noise-transfer preventing circuit 110 having the configuration as shown in FIG. 8, as long as the latch signal L is at "1", the NAND gates 111a and 112a constituting the first-stage flip-flop 110a operate as same as the aforementioned configuration shown in FIG. 6. However, since the output signals from the output terminals c and d of the NAND gates 111a and 112a become "1" when the latch signal L changes to "0" from "1", the output signals from the output terminals e and f of NAND gates 113a and 114a constituting an after-stage flip-flop 110b are fixed (latched) at the state till then.

Though the output block 6 is constituted by the inverter circuits in the aforementioned embodiment, when it is so constituted that the data signal which is to be transferred originally and its inverted signal can be generated simultaneously, for example, a NAND gate, a NOR gate, a clock inverter or a tri-state buffer and the like can also be used.

Though the aforementioned embodiment is constituted to include the apparatus for preventing transferring noise of a digital signal of the present invention in a microcomputer, it is not limited thereto, the present invention is also applicable in the case, where the output block 6 and the input block 10 are located on the different chips and connected by the external bus.

Furthermore, though the flip-flops 11a, 11b (110a, 10b) constituted respectively by two NAND gates are connected in series in two stages also in the input block 10, it will be appreciated that the same operation can be effected by the flip-flops using NOR gates.

As particularly described hitherto, according to the present invention, since noise-transfer preventing means which simultaneously transfers a data signal which is to be transferred originally and its inverted signal to a signal input circuit from a signal output circuit, and when it is judged that the two signals represent same data, maintains a previous signal output state at the signal input circuit side, a proper signal can be transferred at real time without such trouble as comparing the two signals and requesting re-sending when they do not coincide.

According to the present invention, since a signal line for data signal which is to be transferred originally and a signal line for it is inverted signal are wired on a bus in such a manner that, one signal line is apart from third signal line close to the other line or its inverted signal line, the other signal change is prevented from influencing the two signal lines at the same time.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An apparatus for preventing transferring noise of a digital signal, comprising: a signal output circuit which outputs first data as a relatively high potential signal and second data as a relatively low potential signal respectively to a signal line; a bus constituted by a plurality of signal lines including said signal line which transfers the signal outputted from said signal output circuit, and a signal input circuit which inputs the relatively high potential signal as the first data and the relatively low potential signal as the second data respectively from said signal line;

wherein said signal output circuit has inverted signal output means for outputting a signal whose potential represents the second data when the data which is to be outputted originally is the first data, and outputting a signal whose potential represents the first data when the data which is to be outputted originally is the second data, said bus has an inverted signal line for transferring an inverted signal outputted from said inverted signal output means, and said signal input circuit has noise-transfer preventing means for, when the potential signals representing the different data are transferred respectively from said signal line and said inverted signal line, outputting a signal whose potential represents data transferred from said signal line, and when the potential signals representing the same data are transferred from said signal line and said inverted signal line, outputting the signal, which has been outputted before that state, as it is.

2. An apparatus for preventing transferring noise of a digital signal as set forth in claim 1, wherein said noise-transfer preventing means, comprising:

a first circuit which has a first input terminal, a second input terminal, a first output terminal and a second output terminal, wherein said signal line is connected to said first input terminal and said inverted signal line is connected to said second input terminal, when "1" (or "0") is inputted to said first input terminal, "0" (or "1") is inputted to said second input terminal, "0" (or "1") is outputted from said first output terminal, and when "1" (or "0") is outputted from said second output terminal, and when "1" (or "0") is inputted to both said first and second input terminals keep the output till then, and a second circuit which has a first input terminal, a second input terminal, a first output terminal and a second output terminal, wherein said first output terminal of said first circuit is connected to said first input terminal, and said second output terminal of said first circuit is connected to said second input terminal, when "1" (or "0") is inputted to said first input terminal and "0" (or "1") is inputted to said second input terminal, "0" (or "1") is outputted from said first output terminal and "1" (or "0") is outputted from said second output terminal, and when "1" is inputted to both said first and second input terminals, said first and second output terminals keep the output till then;

whereby when "1" (or "0") is outputted to said signal line and "0" (or "1") is outputted to said inverted signal line, said first circuit outputs "0" (or "1") from said first output terminal and "1" (or "0") from said second output terminal, and said second circuit outputs "1" (or "0") from said first output terminal and "0" (or "1") from said second output terminal, when "0" is outputted to said signal line from the state when "1" is outputted to said signal line and "0" is outputted to said inverted signal line, said first circuit outputs "1" from said first output terminal, and said second circuit inputs "1" from said first input terminal and "1" from said second input terminal to output "1" from said first output terminal and "0" from said second output terminal, When "1" is outputted to said inverted signal line from the state where "1" is outputted to said signal line and "0" is outputted to said inverted signal line said first circuit keeps the output till then, and said second circuit inputs "0" from said first input terminal and "1" from said second input terminal to output "1" from said first output terminal and "0" from said second output terminal, when "1" is outputted to said signal line from the state where "0" is outputted to said signal line and "1" is outputted to said inverted signal line, said first circuit keeps the output till then, and said second circuit inputs "0" from said first input terminal and "1" from said second input terminal to output "1" from said first output terminal and "0" from said second output terminal, and when "0" is outputted to said signal line from the state where "1" is outputted to said signal line and "0" is outputted to said inverted signal line, said first circuit outputs "1" from said second output terminal, and said second circuit inputs "1" from said first input terminal and "1" from said second input terminal to output "0" from said first output terminal and "1" from the second output terminal.

3. An apparatus for preventing transferring noise of a digital signal as set forth in claim 2, wherein said first circuit further has a third input terminal into which a latch signal is inputted, and when the significant latch signal is inputted to said third input terminal, outputs "1" from said first and second output terminals.

4. An apparatus for preventing transferring noise of a digital signal as set forth in claim 1, wherein said signal line and said inverted signal line are wired on a bus in such a manner that, one signal line is apart from a third signal line close to the other signal line or its inverted signal line.

* * * * *